UNITED STATES PATENT OFFICE.

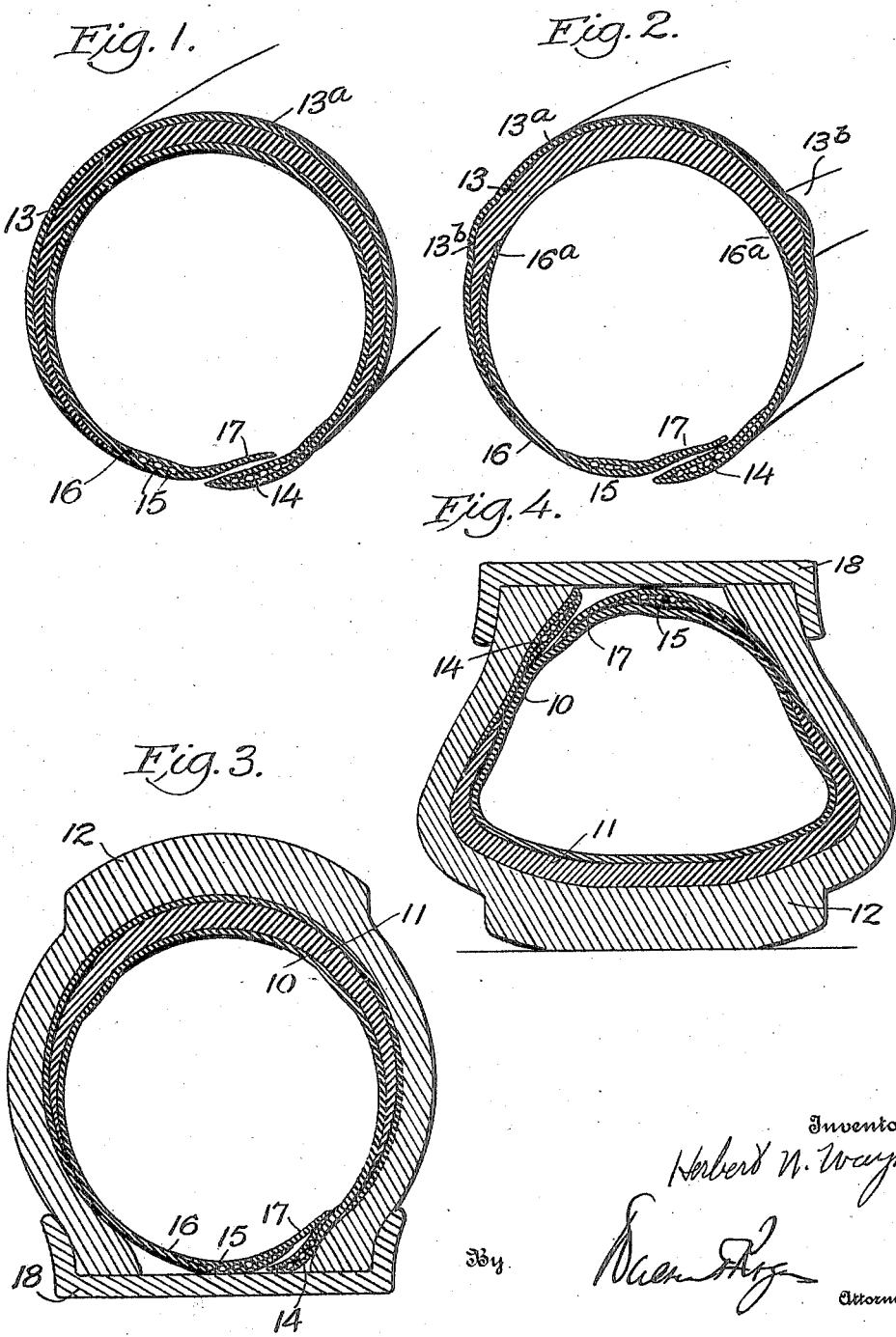

HERBERT N. WAYNE, OF WASHINGTON, DISTRICT OF COLUMBIA.

INNER LINER FOR AUTOMOBILE TIRES.

1,416,917. Specification of Letters Patent. Patented May 23, 1922.

Application filed August 21, 1920. Serial No. 405,004.

*To all whom it may concern:*

Be it known that I, HERBERT N. WAYNE, a citizen of the United States, residing at Washington, District of Columbia, have invented new and useful Improvements in Inner Liners for Automobile Tires, of which the following is a specification.

This invention relates to a pneumatic tire and particularly pertains to a reinforced inner protective lining therefor, and commercially known as an "inner tire."

It is the principal object of this invention to provide an effective economical punctureproof reinforcement for the tire casing, which may be inserted between the inner tube and the shoe; it is also an object to provide means in such a reinforced lining whereby the free edges thereof will be further reinforced to prevent rim-cut blowouts; it is a further object of my invention to provide means whereby internal friction, between the inner tire and the casing will be greatly diminished if not completely eliminated; it is also a further object of my invention to provide reinforcing means sufficiently elastic to allow full and complete adjustment of the inner tire in oversize as well as exact size casings while providing said reinforcing means with sufficient resistance to prevent a weak casing from blowing out.

The invention, its features and the manner in which it accomplishes its objects, will be best understood from the following description, reference being had for that purpose to the accompanying drawings:—

Fig. 1 is a sectional view of my improved inner tire.

Fig. 2 is a sectional view of a modified form thereof.

Fig. 3 is a view in cross section of my improved inner tire surrounding the inner tube and in place within the casing.

Fig. 4 is a cross section showing casing, inner tube and tire as they appear when depressed in contact with the ground.

Referring more particularly to the drawings; 10 represents the inner tube as ordinarily used in pneumatic tires; 11 represents the inner tire as applied between the tube and the casing; 12 represents the tire shoe or casing; 13 represents the thickened tread portion of the inner tire; $13^a$ a soft rubber cover, preferably containing insufficient sulphur for complete vulcanization; $13^b$ a longitudinal rib which may extend circumferentially around the inner tire; "14" and "15" non-extensible restraining bands; 16 a fabric reinforcement; 17 the loose flap edge of fabric reinforcement; and 18 the metal rim on which the tire is seated.

In constructing my improved inner tire I prefer to use an ordinary loose woven light duck or a cord fabric for the bead and flap portions as shown at $16^a$, Fig. 2, for small size tires but for the larger size tires I continue the woven or cord fabric completely around the inner surface of the inner tire as shown at 16 Fig. 1 and may use two or more layers of such fabric for the largest size tires, and a fibrous compound of rubber and ground cotton waste (such as rubberized fabric scraps or waste from hose, belting or tire trimmings) for the main upper side wall and tread portions.

It is important that one of the endless restraining bands 15 be so positioned in the loose flap portion that it will allow an adjustable lateral movement approximately parallel to the face of the rim, thereby permitting adjustment to any possible variation in size (of the cross sectional inner circumference) of different makes of casings, but will effectively restrain said loose flap portion from bulging out through a rim cut blowout as is common with all ordinary reliners and other so-called inner tires. It is also advisable, though not essential, that the outer surface of the inner tire body be coated with a thin layer of soft, preferably unvulcanized, rubber to prevent frictional movement between the inner-tire and the shoe.

A well known property of cotton fibre in combination with rubber is its resistance to penetration or puncture; another important quality, desirable for the present purpose, is its tensile strength and limited expansibility, being, in effect a strong unwoven-fabric body.

The thin outer layer of rubber compound ($13^a$) containing a minus quantity of sulphur is designed to afford a nonabrasive, antifriction surface in contact with the inside surface of the casing.

If desired, this outer surface may be coated with a layer of rubber cement and thus made to adhere tightly to the casing.

An inner tire of the structure and character described will obviously reduce punctures to a minimum, and because of the limited expansibility of the material used in its construction will offer great resistance to the internal air pressure, 70 pounds to 90 pounds, and to the extent of that resistance will relieve the tire casing of that pressure and reduce the liability to blow-out. A further advantage of great commercial importance is the economy of construction, because of the partial replacement of woven fabric, costing at this date July, 1920, approximately 85¢ per pound, by a fibrous rubber compound costing on this same date approximately 18¢ per pound.

Having described the various functions and methods of construction of my improved inner tire, what I claim is:—

1. An inner lining for tire casings having its main body portion composed of fibrous material in mixed combination with rubber, and an outer covering of unvulcanized rubber.

2. An inner lining for tire casings, having its body portion composed of fibre material in mixed combination with rubber, and an outer covering of soft non-fibrous rubber.

In testimony whereof I affix my signature.

HERBERT N. WAYNE.